Patented May 6, 1941

2,241,341

UNITED STATES PATENT OFFICE 2,241,341

METHOD OF ESTERIFYING ROSIN

Clarence D. Ender, Wilmington, Del., assignor to Hercules Powder Company, Wilmington, Del., a corporation of Delaware No Drawing. Application March 30, 1940, Serial No. 326,955

8 Claims. (Cl. 260—104)

This invention relates to an improved method of producing polyhydric alcohol esters of rosins and rosin acids.

The well-known methods for esterifying rosins and rosin acids with polyhydric alcohols involve heating of the rosin or rosin acid with the polyhydric alcohol at temperatures above 200° C. and usually from about 250° C. to 300° C. Even at these high temperatures the rate of esterification is very slow and heating for a number of hours at the high temperatures is required to provide an ester having relatively low acidity. Esters of low acidity are most highly desired since they provide numerous advantages over rosin esters of high acidity in various applications, as for example, lacquers, varnishes, etc. Use of various catalysts has been proposed for the esterification, such as, for example, metallic zinc, zinc oxide, boric acid, calcium oxide, etc., but these known catalysts either have too slight a catalytic effect to be useful practically or are not satisfactory for some other reason, such as, for example, the discoloration or contamination which they cause. In many cases, the long heating periods at high temperatures are injurious to the rosins or rosin acids themselves, causing decarboxylation of the rosin acid to an oil and isomerization of the rosin acid to less desirable modifications. In many cases, the rosin acid degrades in color on too prolonged heating.

It is an object of this invention to provide an improved method of esterifying rosins and rosin acids with polyhydric alcohols.

It is a further object of this invention to provide a method of esterifying rosins and rosin acids with polyhydric alcohols which is more rapid than methods heretofore known and which provides an ester of low acidity with a shorter reaction time.

It is another object of this invention to provide a method of esterifying hydrogenated rosin with polyhydric alcohols which gives an ester of low acidity in shorter time than is possible by previously known methods.

Other objects will appear hereinafter.

I have discovered the very unexpected phenomenon that if the esterification of a rosin or rosin acid with a polyhydric alcohol is carried out in the presence of a small amount of a condensation product of maleic anhydride with a terpene a considerable acceleration of the esterification rate of the rosin or rosin acid occurs. It is very surprising indeed that addition of the strongly acidic terpene-maleic anhydride condensation products to a mixture of a rosin or rosin acid and a polyhydric alcohol will act to accelerate the esterification even without inclusion of additional polyhydric alcohol to take care of esterification of the terpene-maleic anhydride. Furthermore, the terpene-maleic anhydride condensate is an extremely desirable accelerator since it does not contaminate the finished rosin ester or affect its properties adversely, since it is non-discoloring at rosin esterification temperatures and is used in such small amount that its presence in the final rosin ester is practically indistinguishable both on analysis and in the properties of the rosin ester.

The terpene-maleic anhydride condensation products which I have found to be such useful accelerators in rosin esterification may be produced in accordance with the disclosures of U. S. Patents 1,993,025 to Ernest G. Peterson and Edwin R. Littmann and 1,993,031 to Ernest G. Peterson. The terpenes used in preparing these condensation products may be conjugated terpenes, such as alpha-terpinene, or terpenes which do not contain conjugated system of double bonds, as, for example, pinene, dipentene, limonene, terpinolene, and operable equivalents therefor. These condensation products are strongly acidic and are generally of a soft, resinous nature.

The rosins or rosin acids for which my novel esterification accelerator presents advantageous esterification results are any of the various grades of wood and gum rosins, or of the purified rosin acids obtained from such rosins, such as, for example, abietic acid, pimaric acid, sapinic acid, etc. The rosin or rosin acid may likewise be one which has been subjected to some chemical modification, such as hydrogenation, polymerization, isomerization, rearrangement, etc. Thus, hydrogenated rosin, polymerized rosin, heat-treated rosin, Hyex rosin in which a rearrangement of the molecule has been caused to take place by contact with a suitable catalyst, as disclosed in U. S. Patent 2,154,629 to Edwin R. Littmann, may be used. The rosin acids contained in such modified rosins may be used as equivalents of the modified rosins themselves.

The polyhydric alcohols for use in esterifying rosins or rosin acids in accordance with this invention may be any of the polyhydric alcohols known to be useful for esterifying rosins and rosin acids. Thus, the polyhydric alcohol may be an aliphatic glycol, such as, for example, ethylene glycol, propylene glycol, butylene glycol, diethylene glycol, triethylene glycol, trimethylene glycol, or operable equivalents thereof, or it may be a higher polyhydric alcohol, as for example, glycerol, diglycerol pentaerythrite, mannitol, sorbitol, or operable equivalents thereof.

The temperature at which esterification of the rosin or rosin acid with a polyhydric alcohol may be carried out will depend to a large extent on the particular polyhydric alcohol employed. With the lower boiling glycols a temperature above the boiling point of the glycol can only be employed after most of the glycol has undergone partial combination or by use of superatmospheric pressure. Generally speaking, a temperature within the range of about 200° C. to about 300° C. will be suitable. With the higher-boiling polyhydric alcohols, as the higher-boiling glycols, glycerol, pentaerythrite, etc., a temperature within the range of about 250° C. to about 300° C. will be preferred, since the reaction time will be shortest within such a heating range.

The proportion of polyhydric alcohol which may be used in carrying out the esterification of rosins or rosin acids in accordance with the process of this invention will depend on the type of ester desired. Generally speaking, the theoretical proportion of polyhydric alcohol or a small excess thereover will be used, since under such conditions, as is well known, maximum water resistance of the ester is obtained. However, it may be desirable under some circumstances to employ a larger excess of the polyhydric alcohol or a deficiency of polyhydric alcohol. In either case, the effect of my novel esterification accelerator is to provide a lower acidity in the ester in a shorter period of heating.

The amount of the condensation product of maleic anhydride with a terpene which I may employ as an esterification accelerator in accordance with this invention will not be in excess of about 10 per cent by weight based on the weight of the rosin or rosin acid employed in the esterification. Amounts of the accelerator as low as 1 per cent noticeably accelerate the esterification reaction. Preferably an amount not in excess of about 5 per cent by weight based on the weight of rosin or rosin acid will be used.

As is customary in rosin esterification where light color is desirable, the esterification is carried out desirably in the absence of air. Inert atmosphere may be provided by passing an inert gas, as carbon dioxide or nitrogen, through the reaction mixture during the heating.

As illustrative of the practical carrying out of the invention, the following examples may be cited:

Example I

One hundred parts by weight of hydrogenated rosin were esterified with 12.5 parts by weight of glycerol by heating at a temperature of 265 to 271° C. in the presence of 4.9 parts by weight of the condensation product of maleic anhydride and terpinolene, such as described in U. S. Patent 1,993,031, to Ernest G. Peterson, as an esterification accelerator. No additional glycerol was added to combine with the accelerator. As a comparator to illustrate the effect of the accelerator on the esterification rate a similar esterification was carried out with the hydrogenated rosin and glycerol without the accelerator. The comparison of the two preparations is shown in Table 1 below. Both esterifications were performed simultaneously in the same heating bath to obviate the possibility of any influence other than the accelerator. The hydrogenated rosin used had a saturation value of about 70 per cent of both double bonds, an acid number of 168, a melting-point of 80° C. and a Lovibond color of 4 Amber.

Table 1

|  | A | B |
|---|---|---|
| Hydrogenated rosin......parts by weight.. | 100 | 100 |
| Glycerol................................do.... | 12.5 | 12.5 |
| Terpinolene-maleic anhydride........do.... | 4.9 | ........ |
| Temperature of esterification..........°C.. | 265-271 | 265-271 |
| Time of esterification..............hours.. | 9¼ | 14¼ |
| Acid number........................... | 8.1 | 8.6 |
| Melting point (drop)................°C.. | 86.0 | 84.0 |
| Lovibond color......................... | 10 Amber | 15 Amber |

Examination of Table 1 will indicate that the esterification with the added accelerator to approximately the same acidity took place in 9¼ hours as compared to 14¼ hours without the accelerator, corresponding to a decrease in reaction time of approximately 35 per cent. The esters obtained in each case were approximately equivalent, the ester prepared in accordance with the invention being lighter in color.

Example II

One hundred parts by weight of N-wood rosin were esterified with 18.2 parts by weight of pentaerythrite by heating at a temperature of 275 to 280° C. in the presence of terpinolene-maleic anhydride as an esterification accelerator. As a comparator to illustrate the effect of the accelerator on the esterification rate a similar esterification was carried out as in Example I without the inclusion of the accelerator. The comparison of the two preparations is illustrated in Table 2 below.

Table 2

|  | A | B |
|---|---|---|
| N-wood rosin...........parts by weight.. | 100 | 100 |
| Pentaerythrite......................do.... | 18.2 | 18.2 |
| Terpinolene-maleic anhydride........do.. | 5.0 | ........ |
| Temperature of esterification..........°C.. | 275-280 | 275-280 |
| Time of esterification..............hours.. | 12½ | 14 |
| Acid number........................... | 11.5 | 14 |
| Melting point (drop)................°C.. | 121.5 | 112 |
| Lovibond color......................... | 34 Amber | 38 Amber |

It will be seen from Table 2 that the esterification in the presence of the accelerator to an acidity of 11.5 took place in 12.5 hours as compared with 14 hours without the accelerator to an acidity of 14, or a reduction in reaction time of approximately 11% without consideration of the lower acidity obtained. The esters obtained in both cases were approximately equivalent.

From the above examples and description it will be obvious that a condensation product of maleic anhydride with a terpene exerts a unique and unexpected catalytic effect on the esterification of rosins with polyhydric alcohols. In view of the long heating periods required to obtain low acidity esters of rosins with polyhydric alcohols and the detrimental effect which undue heating exerts on rosins, the advantages of the present invention will be readily apparent. Thus the present invention makes it possible to esterify rosins with polyhydric alcohols in a considerably shorter time than has been possible heretofore without deleteriously affecting the ester obtained in any way.

It will be understood that the details and examples hereinbefore set forth are illustrative only and that the invention as broadly described and claimed is in no way limited thereby.

What I claim and desire to protect by Letters Patent is:

1. The method of producing a polyhydric alcohol ester of a wood rosin which includes heating a polyhydric alcohol with a wood rosin in contact with a terpene-maleic anhydride condensation product as an esterification accelerator, the said accelerator being present in an amount not in excess of about 10% by weight of the said rosin.

2. The method of producing a polyhydric alcohol ester of a gum rosin which includes heating a polyhydric alcohol with a gum rosin in contact with a terpene-maleic anhydride condensation product as an esterification accelerator, the said accelerator being present in an amount not in excess of about 10% by weight of the said rosin.

3. The method of producing a polyhydric alcohol ester of a chemically modified rosin which includes heating a polyhydric alcohol with a chemically modified rosin in contact with a terpene-maleic anhydride condensation product as an esterification accelerator, the said accelerator being present in an amount not in excess of about 10% by weight of the said rosin.

4. The method of producing a polyhydric alcohol ester of a hydrogenated rosin which includes heating a polyhydric alcohol with a hydrogenated rosin in contact with a terpene-maleic anhydride condensation product as an esterification accelerator, the said accelerator being present in an amount not in excess of about 10% by weight of the said rosin.

5. The method of producing a polyhydric alcohol ester of a material selected from the group consisting of rosins and rosin acids which includes heating a polyhydric alcohol with the said material in contact with a terpene-maleic anhydride condensation product as an esterification accelerator, the said accelerator being present in an amount not in excess of about 10 per cent by weight of the said rosin material.

6. The method of producing a polyhydric alcohol ester of a material selected from the group consisting of rosins and rosin acids which includes heating a polyhydric alcohol with the said material in contact with a terpene-maleic anhydride condensation product as an esterification accelerator, the said accelerator being present in an amount not in excess of about 5 per cent by weight of the said rosin material.

7. The method of producing a glycerol ester of hydrogenated rosin which includes heating glycerol with hydrogenated rosin in contact with a terpene-maleic anhydride condensation product as an esterification accelerator, the said accelerator being present in an amount not in excess of about 10% by weight of the said rosin.

8. The method of producing a pentaerythrite ester of a rosin which includes heating pentaerythrite with rosin in contact with a terpene-maleic anhydride condensation product as an esterification accelerator, the said accelerator being present in an amount not in excess of about 10% by weight of the said rosin.

CLARENCE D. ENDER.